(12) United States Patent
Lin et al.

(10) Patent No.: US 7,054,085 B2
(45) Date of Patent: May 30, 2006

(54) USE OF SHUNT RESISTOR WITH LARGE RA PRODUCT TUNNEL BARRIERS

(75) Inventors: Tsann Lin, Saratoga, CA (US); Daniele Mauri, San Jose, CA (US); Neil Smith, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 224 days.

(21) Appl. No.: 10/611,590

(22) Filed: Jun. 30, 2003

(65) Prior Publication Data
US 2004/0264067 A1 Dec. 30, 2004

(51) Int. Cl.
*G11B 5/09* (2006.01)

(52) U.S. Cl. .................. 360/46; 360/67; 360/234.4; 360/235.5; 360/313; 360/324.2

(58) Field of Classification Search .............. 360/46, 360/67, 234.4, 234.5, 281, 274, 313, 322, 360/244.1, 324.2; 330/61 R, 62; 324/207.21
See application file for complete search history.

(56) References Cited

U.S. PATENT DOCUMENTS

| | | | |
|---|---|---|---|
| 5,883,767 A | * | 3/1999 | Coffey et al. ............... 360/128 |
| 6,359,289 B1 | | 3/2002 | Parkin |
| 6,667,842 B1 | * | 12/2003 | Comeau et al. .............. 360/67 |
| 6,846,991 B1 | * | 1/2005 | Girard et al. ............... 174/250 |
| 6,848,169 B1 | * | 2/2005 | Shin et al. ............... 29/603.14 |

* cited by examiner

*Primary Examiner*—David Hudspeth
*Assistant Examiner*—Dismery Mercedes
(74) *Attorney, Agent, or Firm*—Joseph P. Curtin; Matthew S. Zises

(57) ABSTRACT

A read head for use with an interconnect transmission line having a characteristic impedance of $Z_0$ includes a tunnel valve device and a shunt resistor RS that is connected in parallel across the tunnel valve device. The tunnel valve device has a device resistance $R_T$ corresponding to a predetermined resistance-area (RA) product. The value of the shunt resistance is based on the parallel combination of $R_T$ and $R_S$ substantially equaling the characteristic impedance $Z_0$ of the interconnect transmission line. The predetermined resistance-area (RA) product is about equal to at least about 10 Ohms-$\mu m^2$. Alternatively, the predetermined resistance-area (RA) product is about equal to a "corner" value of $RA_c$ for the tunnel valve device.

16 Claims, 3 Drawing Sheets

USE OF SHUNT RESISTOR WITH LARGE RA PRODUCT TUNNEL BARRIERS

TECHNICAL FIELD

The present invention relates to storage devices. In particular, the present invention relates to a tunnel valve read head for a disk drive that minimizes the effective device resistance $R_D$ and improves the device Signal-to-Noise Ratio (SNR).

BACKGROUND OF THE INVENTION

FIG. 1 shows an exemplary high-RPM disk drive 100 having a magnetic read/write head (or a recording slider) 101 that includes, for example, a tunnel-valve read sensor, that is positioned over a selected track on a magnetic disk 102 using, for example, a two-stage servo system for reading data stored on disk 102. The two-stage servo system includes a voice-coil motor (VCM) 104 for coarse positioning a read/write head suspension 105 and may include a microactuator, or micropositioner, for fine positioning read/write head 101 over the selected track.

A problem associated with tunnel-valve read sensors is that achievable values of the resistance-area (RA) product for tunnel junctions having large and/or optimized Tunnel Magneto-Resistance (TMR) values (i.e., $\Delta R/R_0$) are too large for achieving a desirable device resistance $R_D$ of less than approximately 300 Ohms for device areas $A_D$ that are smaller than 0.1 $\mu m^2$. The motivation for a lower device resistance $R_D$ is primarily for increasing the signal power ($\propto (\Delta R/R)^2 (V_{bias})^2/R_D$) while simultaneously reducing the shot-noise of a tunnel-valve head ($\propto R_D$) when operated at a given bias voltage $V_{bias}$, which is otherwise limited by additional considerations that are described below. A secondary consideration is for avoiding excessive device impedance mismatch with the characteristic impedance $Z_0$ of the transmission line interconnection to the Arm Electronics (AE) module, which is typically less than or equal to 100 Ohms. A mismatch has the effect of increasing amplifier noise. Accordingly, constraining $R_D=(RA)/A_D$ to be less than 300 Ohms requires RA to be greater than 1–2 Ohms-$\mu m^2$.

FIG. 2 is a graph 200 showing the approximate relationship between RA and $\Delta R/R_0$ for a typical tunnel junction in which RA and $\Delta R/R_0$ are respectively the abscissa and the ordinate of graph 200. As RA is reduced below a "corner" value of $RA_c$ by reducing the physical barrier thickness, the low-voltage TMR ratio $\Delta R/R_0$ begins to degrade approximately linearly as RA decreases. Tunnel valve barriers typically exhibit an $RA_c$ value of approximately 5–10 Ohms-$\mu m^2$. Thus, the achievable $\Delta R/R_0$ for an RA<1–2 Ohms-$\mu m^2$ will be significantly below the maximum value of $\Delta R/R_{max}$ that is obtainable for thicker, higher-RA barriers of the same barrier material. Reducing RA by decreasing barrier thickness also results in barriers that are less physically robust and that are more susceptible to pinholes and/or other run-to-run variabilities that can yield large distribution of both $\Delta R/R_0$ and RA values across a wafer and/or from wafer-to-wafer. Such variations are much less prevalent when thicker tunneling barriers having $RA \geq RA_c$ are used.

Additionally, it is well known that the TMR ratio is not independent of the bias voltage, but instead decreases monotonically with larger $V_{bias}$. FIG. 3 is a graph 300 showing a typical $\Delta R/R$ for a tunneling barrier as a function of $V_{bias}$. As shown in FIG. 3, $\Delta R/R$ decreases approximately linearly with increasing $V_{bias} \leq V_{50}$, in which $V_{50}$ is the value of $V_{bias}$ for which the TMR ratio $\Delta R/R$ has degraded to one-half of its low voltage limit. For this reason alone, it becomes impractical to operate tunnel-valve read sensors at bias voltages larger than $V_{bias}$. Long-term degradation, however, usually limits the practical barrier bias voltage $V_{bias}$ to well below the $V_{50}$ value. Depending on the barrier material, $V_{50}$ also tends to degrade for thinner, lower-RA barriers, and is, at best, approximately constant with $RA \leq RA_c$.

What is needed is a technique that minimizes the effective device resistance $R_D$ of a tunnel valve read head and improves the device Signal-to-Noise Ratio (SNR) of a tunnel valve read head.

SUMMARY OF THE INVENTION

The present invention minimizes the effective device resistance $R_D$ of a tunnel valve read head and improves the device Signal-to-Noise Ratio (SNR) of a tunnel valve read head.

The advantages of the present invention are provided by a read head for use with an interconnect transmission line having a characteristic impedance of $Z_0$. The read head includes a tunnel valve device and a shunt resistance $R_S$. The tunnel valve device has a device resistance $R_T$ corresponding to a predetermined resistance-area (RA) product. The shunt resistance $R_S$ is connected in parallel across the tunnel valve device. The value of the shunt resistance is chosen such that the parallel combination of $R_T$ and $R_S$ substantially equals a predetermined selected value of resistance, such as the characteristic impedance $Z_0$ of the interconnect transmission line. According to one aspect of the present invention, the predetermined resistance-area (RA) product is about equal to at least about 10 Ohms-$\mu m^2$. According to another aspect of the present invention, the predetermined resistance-area (RA) product is about equal to a value of a resistance-area (RA) product in which a Tunnel Magneto-Resistance (TMR) ratio $\Delta R/R_0$ for the tunnel valve device does not substantially increase for further increase in the value of the resistance-area (RA) product.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides minimizes the effective device resistance $R_D$ of a tunnel valve read head and improves the device Signal-to-Noise Ratio (SNR) of a tunnel valve read head. The shunt resistor $R_S$ is preferably fabricated directly on the substrate/slider using standard deposition and photolithographic techniques, although the shunt resistor could also possibly be supplied externally as part of the AE module. A tunnel valve head can be designed using the shunt resistor $R_S$ of the present invention for a given targeted device area $A_D$ and resistance $R_D$, while simultaneously fabricating the tunnel valve barrier to have a much more physically robust thickness in which $RA \approx RA_c$, despite that the intrinsic tunnel sensor resistance $R_T = RA_c/A_D$ may significantly exceed $R_D$. The present invention minimizes the effective device resistance $R_D$ of a tunnel valve head without excessively compromising signal/noise ratio (SNR) and device robustness relating to device yield, wafer variability, and long-term reliability.

Figure 4:
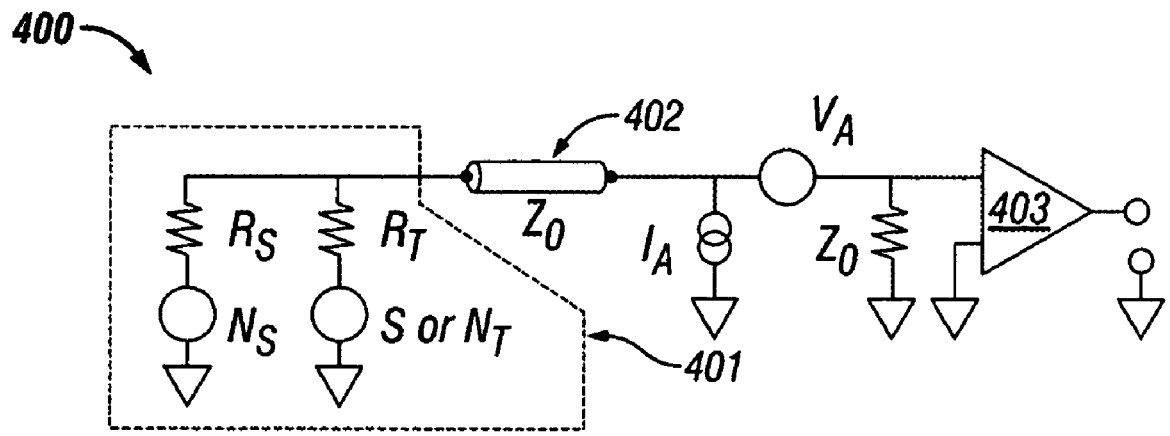
FIG. 4 shows an equivalent circuit schematic diagram of an MTJ sensor valve, a head-to-AE interconnect transmission line and an AE preamplifier.

FIG. 4 shows an equivalent circuit schematic diagram 400 of an MTJ sensor valve 401, a head-to-AE interconnect transmission line 402 and an AE preamplifier 403. MTJ sensor valve 401 includes tunnel valve sensor resistance $R_T$ and shunt resistance $R_S$. As shown in FIG. 4, MTJ sensor valve 401 is modeled to include a signal voltage $S_T$ and/or a noise source $N_T$. Shunt resistance $R_S$ is modeled to include a noise source $N_S$. Preamplifier 403 is modeled to include rms voltage noise source $V_A$ and current noise source $I_A$. Additionally, the input impedance of preamplifier 403 is assumed to be equal to the characteristic impedance $Z_0$ of interconnection transmission line 402 so that both the rms signal voltage $S_T$ and rms noise voltage $N_T$ of MTJ sensor valve 401 are transmitted to preamplifier 403 without reflection.

The expected voltage signal power of the MJT sensor valve $S_D^2$ is given by, $$S_D^2 = (Z/R_T)^2 V_{bias}^2 (\Delta R/R)_0^2 \left(1 - \frac{1}{2}|V_{bias}/V_{50}|\right)^2, \quad (1)$$

in which $$Z = R_D \| Z_0 \quad (2)$$

and $$R_D = R_T \| R_S \quad (3)$$

The noise power $N_D^2$ at the input to preamplifier 403 is given by $$N_D^2 = \left|\frac{Z}{R_T}\right|^2 4kTR_T \left\{\frac{V_{bias}}{V_{th}} \coth\left(\frac{V_{bias}}{V_{th}}\right)\right\} + \left|\frac{Z}{R_S}\right|^2 4kTR_S, \quad (4)$$

in which $$V_{th} = 2kT/e \approx 60 \text{ mV} \quad (5)$$

Figure 2:
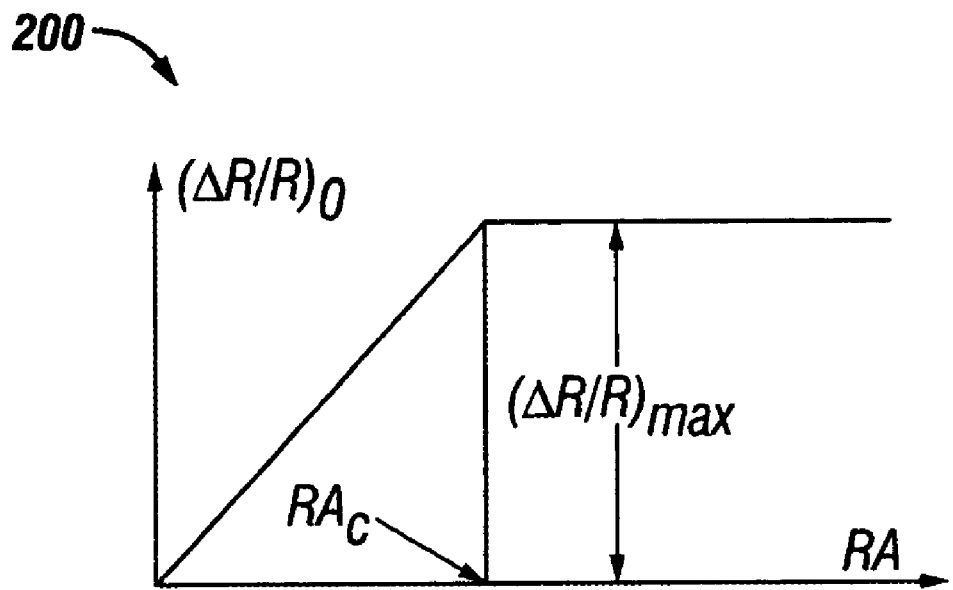
FIG. 2 is a graph showing the approximate relationship between RA and $\Delta R/R_0$ for a tunnel junction.
Figure 3:
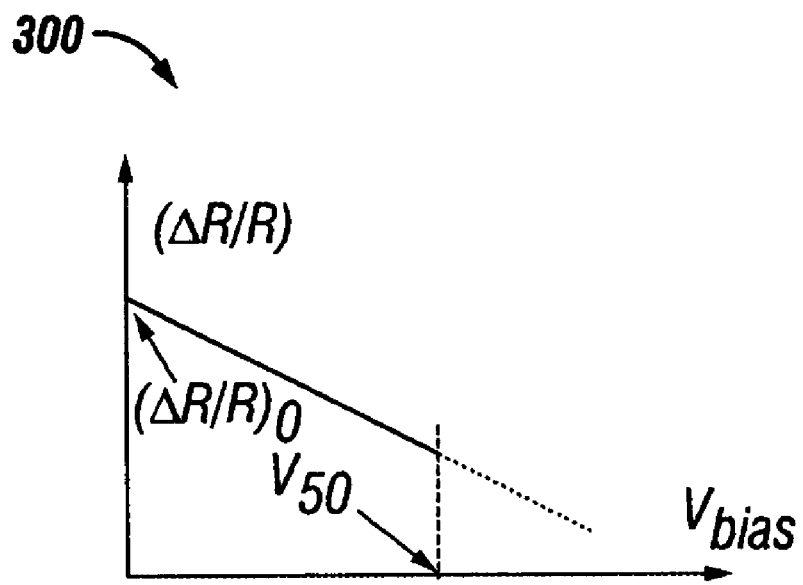
FIG. 3 is a graph showing a typical $\Delta R/R$ for a tunneling barrier as a function of $V_{bias}$.

The expressions for both $S_D^2$ and $N_D^2$ include the shunting effects of both the shunt resistor $R_S$ of the present invention, as well as that of the preamplifier input impedance $Z_0$. The expression for the noise power $N_D^2$ includes the shot noise plus the Johnson noise for the tunnel valve, in addition to the Johnson noise for the shunt resistor $R_S$. (For simplicity, this expression excludes the noise due to the current and voltage noise of the amplifier which depend on the reflections at the impedance-mismatched interface between transmission-line and read sensor.) For bias voltages that are expected between 100–200 mV, the shot noise power for the tunnel valve substantially exceeds the Johnson noise $4kTR_T$ for the tunnel-valve device, as well as and the Johnson noise $4kTR_S$ for a comparable shunt resistance, and varies essentially linearly with $V_{bias}$. The expression for signal power $S_D^2$ explicitly includes the dependence on $\Delta R/R(V_{bias})$, which is shown in FIG. 3, but only implicitly includes the dependence of $\Delta R/R_0$ on the RA product of the tunnel barrier, which is shown in FIG. 2. The dependence of $\Delta R/R_0$ on the RA product of the tunnel barrier is of key importance because signal power varies as $(\Delta R/R_0)^2$.

To emphasize the importance of the dependence of $\Delta R/R_0$ on the RA product of the tunnel barrier, the signal and noise expressions are used for computing the signal/noise ratio SNR as $$SNR = \frac{S_D^2}{N_D^2} \quad (6)$$

for a conventional tunnel-valve head and for a tunnel-valve head having a shunt resistance $R_S$ according to the present invention for a design target device resistance $R_D$ and a design target device area $A_D$. For the conventional tunnel-valve head design, there is no shunt resistor (i.e., $R_S$ goes to infinity), and the tunnel barrier thickness is chosen such that the RA product of the barrier is $$RA_1 = R_D A_D. \quad (7)$$

Figure 1:
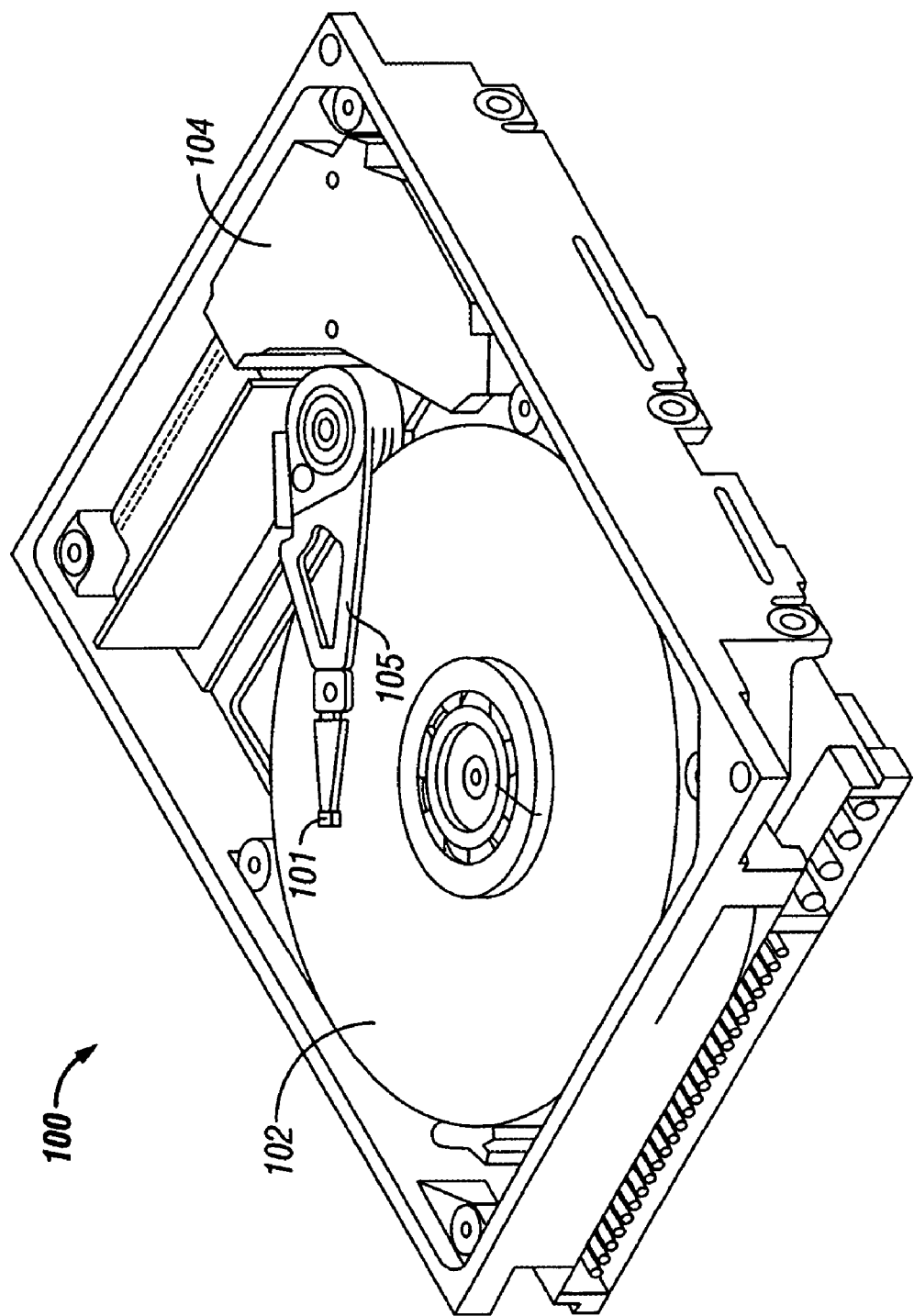
FIG. 1 shows an exemplary high-RPM disk drive having a magnetic read/write head.

For the a tunnel-valve head design having a shunt resistance $R_S$ according to the present invention, the tunnel barrier thickness is increased such that $$RA_2 = RA_c, \quad (8)$$

i.e., the value at the "corner" of the $\Delta R/R_0$ vs. RA curve shown in FIG. 1. The head resistance of the tunnel valve is then $$R_T = \frac{RA_c}{A_D} \quad (9)$$

and the shunt resistor $R_S$ is then chosen such that the parallel combination of $R_T$ and $R_S$ ($R_T \| R_S$) equals the target device resistance $R_D$. That is, $$R_S = R_T R_D / (R_T - R_D). \quad (10)$$

It is naturally assumed that $R_D \leq R_T$ because, otherwise, shunt resistor $R_S$ becomes superfluous.

For comparison purposes, the following parameter values will be assumed: $A_D = 0.005$ μm$^2$, $V_{50} = 400$ mV, $RA_C = 10$ Ohms-μm$^2$, and $Z_0 = 75$ Ohms. In this case, the intrinsic sensor resistance of a thick barrier with $RA = RA_C$ would be an excessively large $R_T = RA_C/A_D = 2000$ Ohms. The characteristic "thermal voltage" $V_{th} = 2kT/e$ (50 mV at room temperature) is taken to be 60 mV.

Figure 5:
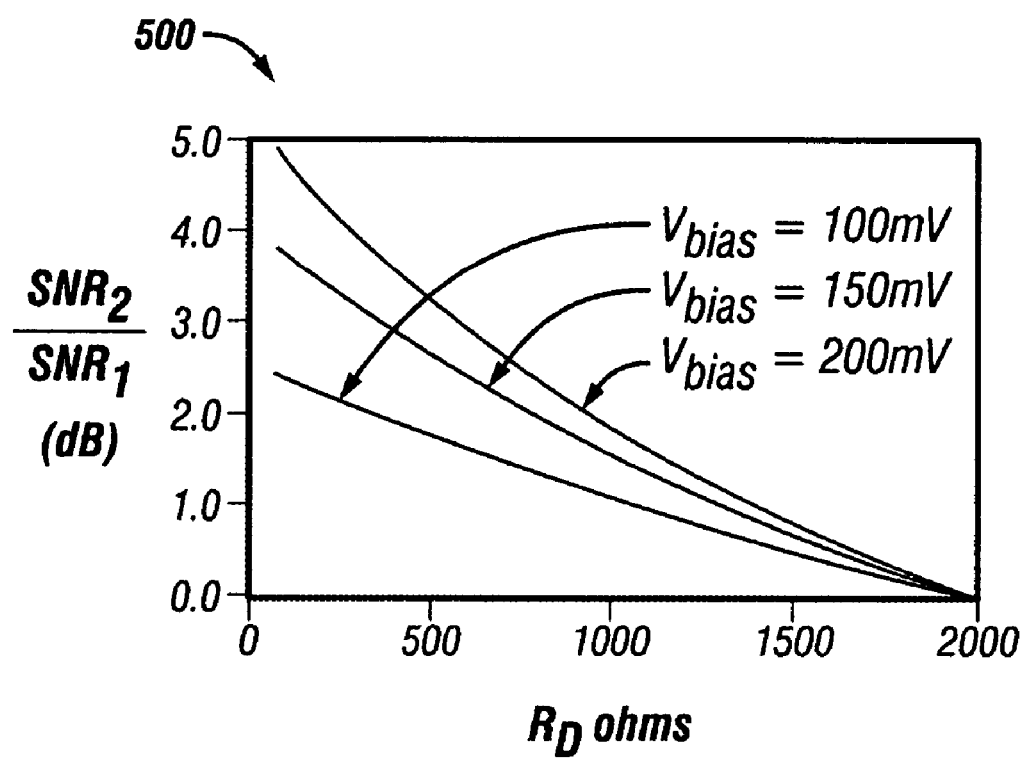
FIG. 5 is a graph showing the ratio of $SNR_2:SNR_1$ as a function of $R_D$ for several values of $V_{bias}$.

FIG. 5 is a graph showing the ratio of $SNR_2:SNR_1$ as a function of design target device resistance $R_D$ for several values of $V_{bias}$. In FIG. 5, $SNR_1$ is the SNR for a conventional tunnel-valve head and $SNR_2$ is the SNR for a tunnel-valve head having a shunt resistance $R_S$ according to the present invention. As shown in FIG. 5, the ratio of $SNR_2:SNR_1$ increases as $R_D$ decreases. The two designs are equivalent when $R_D = 2$ kOhms. In the case of a more desirable design target resistance of $R_D = 300$ Ohms, a significantly greater intrinsic sensor signal/noise ratio (i.e., 3–4 dB excluding amplifier noise) can be achieved with the present invention by using a physically robust RA=10 Ohms-μm² barrier combined with shunt resistor $R_S$=350 Ohms. In contrast, a conventional tunnel-valve head design requires that a thin tunnel barrier be fabricated having a very low value of RA=1.5, and having an expected 85% TMR loss of $\Delta R/R_0 = (RA/RA_C = 0.15)\Delta R/R_{max}$ for the same design target resistance of $R_D$=300 Ohms. The comparative SNR advantage of the present invention increases as the target device resistance $R_D$ is further reduced and/or bias voltage $V_{bias}$ is increased.

Generally, the advantages of the present invention are related to the dependence $\Delta R/R_0$ on RA, as shown in FIG. 2. Provided that $RA \leq RA_c$, $\Delta R/R_0$ scales approximately as RA, while $R_T$ scales as RA for a fixed $A_D$. Thus, $\Delta R/R_0$ scales approximately as $R_T$. For typical parameter values for the circuit of FIG. 4 in which $Z_0 << R_T$, $R_S$, such that $Z \approx Z_0$, $S_D^2$ becomes roughly independent of $R_T$, but $N_D^2$ scales as $1/R_D + 1/R_T * [V_{bias}/V_{th} \coth(V_{bias}/V_{th}) - 1]$. Thus, for a fixed target $R_D$, noise power is reduced and SNR increased by increasing intrinsic $R_T$. Noise power is further reduced and SNR is further increased as $V_{bias}$ increases, particularly when $V_{bias} >> V_{th}$, which is expected to be the case in practice. At very low $R_D$ approaching $Z_0$, which in the unshunted (conventional) case $R_D = R_T$, $S_D^2$ additionally begins to decrease with reduced $R_T$, and the SNR advantage of the shunt resistor of the present invention accelerates, a trend that is also evident in FIG. 5. Finally, the advantage in intrinsic sensor SNR provided by the present invention is not based on any additional benefit of a potential increase in $V_{50}$ and/or safe and stable maximum operating bias voltage when using a higher $R_T$, physically thicker and more robust tunnel barrier afforded by the present invention.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A read head for use with an interconnect transmission line having a characteristic impedance of $Z_0$, the read head comprising:
   a tunnel valve device, the tunnel valve device having a device resistance $R_T$ corresponding to a predetermined resistance-area (RA) product; and
   a shunt resistance $R_S$ connected in parallel across the tunnel valve device, a value of the shunt resistance being based on the parallel combination of $R_T$ and $R_S$ substantially equaling a predetermined selected value of resistance, wherein the shunt resistance $R_S$ is located on a substrate/slider for the read head.

2. The read head according to claim 1, wherein the predetermined selected value of resistance substantially equaling the characteristic impedance $Z_0$ of the interconnect transmission line.

3. The read head according to claim 1, wherein the predetermined resistance-area (RA) product is about equal to at least about 10 Ohms-μm².

4. The read head according to claim 1, wherein the predetermined resistance-area (RA) product is about equal to a value of a resistance-area (RA) product in which a Tunnel Magneto-Resistance (TMR) ratio $\Delta R/R_0$ for the tunnel valve device does not substantially increase for further increase in the value of the resistance-area (RA) product.

5. A disk drive, comprising:
   an interconnect transmission line having a characteristic impedance of $Z_0$; and
   a read head having a tunnel valve device and a shunt resistance $R_S$, the tunnel valve device having a device resistance $R_T$ corresponding to a predetermined resistance-area (RA) product; the shunt resistance $R_S$ being connected in parallel across the tunnel valve device, and a value of the shunt resistance being based on the parallel combination of $R_T$ and $R_S$ substantially equaling a predetermined selected value of resistance, wherein the shunt resistance $R_S$ is located on a substrate/slider for the read head.

6. The disk drive according to claim 5, wherein the predetermined selected value of resistance substantially equaling the characteristic impedance $Z_0$ of the interconnect transmission line.

7. The disk drive according to claim 5, wherein the predetermined resistance-area (RA) product is about equal to at least about 10 Ohms-μm².

8. The disk drive according to claim 5, wherein the predetermined resistance-area (RA) product is about equal to a value of a resistance-area (RA) product in which a Tunnel Magneto-Resistance (TMR) ratio $\Delta R/R_0$ for the tunnel valve device does not substantially increase for further increase in the value of the resistance-area (RA) product.

9. A read head for use with an interconnect transmission line having a characteristic impedance of $Z_0$, the read head comprising:
   a tunnel valve device, the tunnel valve device having a device resistance $R_T$ corresponding to a predetermined resistance-area (RA) product; and
   a shunt resistance $R_S$ connected in parallel across the tunnel valve device, a value of the shunt resistance being based on the parallel combination of $R_T$ and $R_S$ substantially equaling a predetermined selected value of resistance, wherein the shunt resistance $R_S$ is located at an arm electronics module associated with the read head.

10. The read head according to claim 9, wherein the predetermined selected value of resistance substantially equaling the characteristic impedance $Z_0$ of the interconnect transmission line.

11. The read head according to claim 9, wherein the predetermined resistance-area (RA) product is about equal to at least about 10 Ohms-μm².

12. The read head according to claim 9, wherein the predetermined resistance-area (RA) product is about equal to a value of a resistance-area (RA) product in which a Tunnel Magneto-Resistance (TMR) ratio $\Delta R/R_0$ for the tunnel valve device does not substantially increase for further increase in the value of the resistance-area (RA) product.

13. A disk drive, comprising:
   an interconnect transmission line having a characteristic impedance of $Z_0$; and
   a read head having a tunnel valve device and a shunt resistance $R_S$, the tunnel valve device having a device resistance $R_T$ corresponding to a predetermined resistance-area (RA) product; the shunt resistance $R_S$ being connected in parallel across the tunnel valve device, and a value of the shunt resistance being based on the parallel combination of $R_T$ and $R_S$ substantially equaling a predetermined selected value of resistance, wherein the shunt resistance $R_S$ is located at an arm electronics module associated with the read head.

14. The disk drive according to claim 13, wherein the predetermined selected value of resistance substantially equaling the characteristic impedance $Z_0$ of the interconnect transmission line.

15. The disk drive according to claim 13, wherein the predetermined resistance-area (RA) product is about equal to at least about 10 Ohms-$\mu m^2$.

16. The disk drive according to claim 13, wherein the predetermined resistance-area (RA) product is about equal to a value of a resistance-area (RA) product in which a Tunnel Magneto-Resistance (TMR) ratio $\Delta R/R_0$ for the tunnel valve device does not substantially increase for further increase in the value of the resistance-area (RA) product.

* * * * *